United States Patent
Zhao et al.

(10) Patent No.: US 11,860,590 B2
(45) Date of Patent: Jan. 2, 2024

(54) MODEL-FREE OPTIMIZATION METHOD OF PROCESS PARAMETERS OF INJECTION MOLDING

(71) Applicant: ZHEJIANG UNIVERSITY, Hangzhou (CN)

(72) Inventors: Peng Zhao, Hangzhou (CN); Zhengyang Dong, Hangzhou (CN); Kaipeng Ji, Hangzhou (CN); Hongwei Zhou, Hangzhou (CN); Jianguo Zheng, Hangzhou (CN); Tingyu Wang, Hangzhou (CN); Jianzhong Fu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 387 days.

(21) Appl. No.: 17/328,440

(22) Filed: May 24, 2021

(65) Prior Publication Data
US 2021/0389737 A1    Dec. 16, 2021

(51) Int. Cl.
    *G05B 13/04*    (2006.01)
    *B22D 17/32*    (2006.01)
    *B29C 45/76*    (2006.01)
    *G06F 17/16*    (2006.01)

(52) U.S. Cl.
    CPC .......... *G05B 13/042* (2013.01); *B22D 17/32* (2013.01); *B29C 45/76* (2013.01); *G06F 17/16* (2013.01); *B29C 2945/76949* (2013.01)

(58) Field of Classification Search
None
See application file for complete search history.

(56) References Cited

U.S. PATENT DOCUMENTS

| 8,364,453 B2 * | 1/2013 | Linn ................. G06F 30/20 703/2 |
| 2018/0178430 A1 * | 6/2018 | Stoehr ............... G06F 30/20 |
| 2021/0260802 A1 * | 8/2021 | Charest-Finn ........ B29C 45/766 |

OTHER PUBLICATIONS

CN202010460745.1—First Office Action, dated Apr. 26, 2022, 8 pages.

* cited by examiner

*Primary Examiner* — Ryan A Jarrett
(74) *Attorney, Agent, or Firm* — Getech Law LLC; Jun Ye

(57) ABSTRACT

The present invention discloses a model-free optimization method of process parameters of injection molding to solve the problems of frequent tests required and performing adaptive adjustment on different parameters in the existing optimization method. The method need not build a surrogate model between a product quality index and a process parameter to render the process parameter to converge nearby the optimal solution by an on-line iteration method. The present invention calculates the gradient direction of a current point by an iterative gradient estimation method, and uses adaptive moment estimation algorithm to allocate an adaptive step for each parameter. The method can significantly reduce the cost and time required in the process parameter, which greatly helps improving the optimization efficiency of process parameters of injection molding.

9 Claims, 2 Drawing Sheets

MODEL-FREE OPTIMIZATION METHOD OF PROCESS PARAMETERS OF INJECTION MOLDING

FIELD OF THE INVENTION

The present invention belongs to an optimization method of process parameters, and particularly relates to a model-free optimization method of process parameters of injection molding.

BACKGROUND OF THE INVENTION

Injection molding is a typical batch process; and at present, materials for injection molding include: plastics, rubber, magnetic powder, metal, and the like. Injection molding for plastics is set as an example, and each batch process includes three stages: a filling stage, a packing stage, cooling and plasticizing stages. During filling stage, melt is pushed into a die cavity by an injection molding machine, and switched to the packing stage after passing a speed/pressure (V/P) switch point to maintain a certain packing pressure, thus compensating shrinkage. Afterwards, a screw in a charging barrel is drawn back and inverted to heat and plastify new plastic particles, and the plastic melt in the die is cooled for a period of time for fixed formation till the product can be ejected out of the die.

Die design, part design, raw materials and process parameters are the most factors to influence injection products. After determining the design of die and parts, and the type of raw materials, process parameters are the most factors to influence product quality, production rate and energy consumption. Therefore, it is significant to determine optimal process parameters. However, numerous parameters are involved in the injection molding process, there is a coupling relationship among different parameters, and there is a time-varying and non-linear relationship between the optimization objective and parameters; therefore, such work remains a challenge.

The trial-and-error method and other conventional methods depend on the personal experience of technicians to a great extent, thus, regulating process parameters by repeated trails and errors. Such kind of optimization method wastes time and requires multiple tests, which cannot satisfy the industrial efficiency requirements. With the development of numerical analysis, lots of researchers use different mathematical models to the parameter optimization method, and these methods can be classified into two types: model-based optimization, MBO and model-free optimization, MFO.

MBO needs to gather several sets of process parameters and the corresponding optimal target values, and to build a surrogate model of optimization objectives and parameters by means of these data. The method for building a surrogate model includes artificial neural network (ANN), support vector machine (SVM), and the like. Due to the complexity of injection molding process, it requires a large number of test data to build an enough-accuracy surrogate model for regression fit, thereby increasing the optimal cost. Moreover, the relationship between the optimization objective and the process parameter generally varies from materials, product structures and the like. Therefore, the surrogate model built by MBO is only suitable for a specific type of material and structure, and cannot be directly generalized to other products, that is, it is a process in need of rebuilding a surrogate model, thereby reducing the optimization efficiency.

Compared with MBO, MFO need not build a surrogate model in advance, but regards the optimal target value obtained in each step as feedback, thus judging the current optimized direction and gradually iterating to the optimal process parameter. The key of MFO is to seek an accurate optimized direction and to distribute the optimal step of each parameter. MFO can be divided into two types: a gradient based method and non-gradient based method. The non-gradient based method is to find the parameter closer to the optimization objective according to random search, thus determining the optimized direction, such as, Nelder-Mead method, evolutionary algorithms, and the like. The method has the advantages of estimating the gradient without an extra test, while there is certain randomness in the optimization procedure, and the rate of convergence is lower than that of the gradient based method. Generally, the gradient based method requires an extra test for fitting the gradient, just like a simultaneous perturbation stochastic approximation (SPSA) method, due to the clear optimized direction provided by the gradient, the gradient based method has faster rate of convergence, capable of obtaining the optimal process parameter with less experiment cost. At present, there are some shortcomings in MFO: the determination of optimized direction generally requires extra tests to fit the gradient, improving the optimization cost; the adjustment step for each parameter is usually the same during the parameter adjustment process, and the adaptability to different parameters is not taken into full consideration. Based on the above, it is necessary to propose a model-free adaptive optimization method to improve the optimization efficiency of the process parameter.

SUMMARY OF THE INVENTION

The present invention aims at solving the shortcomings remaining in the optimization method of process parameters in the existing injection molding, and providing a faster, low-cost and adaptive optimization method of process parameters.

In the present invention, an iterative gradient estimation method is used to calculate the gradient direction at the current point as a parameter adjustment direction, and adaptive moment estimation algorithm is used to achieve the adaptive adjustment of each adjustment step, thus solving the problems of frequent tests and low adaptability to different parameters in the existing optimization method, and achieving the rapid optimization of process parameters with a small amount of tests finally.

To achieve the above objective, the present invention has the following technical solution:

A model-free optimization method of process parameters of injection molding, includes the steps of:

(1) determining a quality index Q to be optimized and a quality index target value $Q_{target}$ directed to the injection molding technology to be optimized;

(2) determining n process parameters to be optimized, determining and pretreating initial values of the process parameters to be optimized to obtain an initial parameter sample;

(3) respectively perturbing each parameter of a current parameter sample to obtain n sets of perturbed parameter samples, and finally obtaining n+1 sets of parameter samples including the current parameter sample and corresponding n+1 quality index values $Q_1$;

(4) using n+1 quality index values $Q_1$ obtained by acquisition to calculate a gradient value at the current parameter sample;

(5) based on the obtained gradient value, updating the current parameter sample, and using the updated parameter sample to calculate a corresponding quality index value $Q_2$; making a comparison between the quality index value $Q_2$ and the quality index target value $Q_{target}$ of the quality index:

outputting an optimum process parameter if it meets requirements;

or, using the updated parameter sample and quality index value $Q_2$ to replace a set of parameter sample having the worst quality value in n+1 sets of parameter samples in step (3) and the quality index value $Q_1$, and returning to step (4).

In step (1), the determination of the optimized quality index Q (e.g., product weight, warping, and the like), quality index target value $Q_{target}$ and a permissible error δ of an optimization objective, and the selection of the parameters $X=(x_1, x_2, \ldots, x_n)^T$ to be optimized and feasible scope thereof are shown in the Formula below:

$$\min_X J(X) = |Q(X) - Q_{target}|$$
$$\text{s.t. } L_i \leq x_i \leq U_i, i = 1, 2, \ldots, n$$
$$X = (x_1, x_2, \ldots, x_n)^T$$

J(X) denotes the difference between the current quality index value and a target value (namely, $Q_{target}$). The quality index value Q(X) can be regarded as an implicit function of process parameters X, and X consists of n parameters $x_1$, $x_2, \ldots, x_n$, such as, packing pressure, melt temperature; $L_i$ and $U_i$ denote upper and lower bound of parameter $x_i$.

Different parameters have differences in orders of magnitude, for example, there is a difference of two orders of magnitude between melt temperature and injection time; usually, parameters need to be normalized by the following formula during parameter optimization process, and the normalization can ensure that each parameter can change with the same extent. Preferably, in step (2), the pretreating process is as follows:

$$x_{i_{norm}} = \frac{x_i - L_i}{U_i - L_i}$$

where: $x_i$ is a certain process parameter; $x_{i_{norm}}$ is a pretreated parameter of $x_i$; $L_i$ is a minimum value corresponding to the process parameter; $U_i$ is a maximum value corresponding to the process parameter.

In the present invention, the quality index value $Q_1$, and the quality index value $Q_2$ can be obtained by simulations or experiments.

In step (3), each parameter is perturbed respectively to obtain n+1 sets of process parameters and corresponding quality values in total, thus obtaining the corresponding optimal target value J, where the perturbing size and direction are not limited strictly:

$$X^0 = [x_1^0, x_2^0, \ldots, x_n^0]^T, J(X^0) = J_0$$
$$X^1 = [x_1^1, x_2^1, \ldots, x_n^1]^T = [x_1^0 + \delta_1, x_2^0, \ldots, x_n^0]^T, J(X^1) = J_1$$
$$\vdots$$
$$X^n = [x_1^n, x_2^n, \ldots, x_n^n]^T = [x_1^0, x_2^0, \ldots, x_n^0 + \delta_n]^T, J(X^n) = J_n$$

where, $J(X^0), J(X^1)$ and $J(X^n)$ are difference values between a quality value and a quality target value corresponding to $X^0, X^1$ and $X^n$ (that is, corresponding to an absolute value of a difference between the quality value and the quality index target value);

in step (4), J(X) is expanded according to the Taylor Series Expansion thereof at $X^0$:

$$J(X^1) = J(X^0) + (x_1^1 - x_1^0)\frac{\partial J}{\partial x_1} + \cdots + (x_n^1 - x_n^0)\frac{\partial J}{\partial x_n} + R_1(X)$$
$$\vdots$$
$$J(X^n) = J(X^0) + (x_1^n - x_1^0)\frac{\partial J}{\partial x_1} + \cdots + (x_n^n - x_n^0)\frac{\partial J}{\partial x_n} + R_n(X)$$

a matrix form is written below:

$$\begin{bmatrix} J(X^1) - J(X^0) \\ \vdots \\ J(X^n) - J(X^0) \end{bmatrix} = \begin{bmatrix} x_1^1 - x_1^0 & \cdots & x_n^1 - x_n^0 \\ \vdots & \ddots & \vdots \\ x_1^n - x_1^0 & & x_n^n - x_n^0 \end{bmatrix} \begin{bmatrix} \frac{\partial J}{\partial x_1} \\ \vdots \\ \frac{\partial J}{\partial x_n} \end{bmatrix}$$

further, the gradient value of the current parameter sample at $X^0$ can be calculated by the following Formula:

$$\nabla J(X^0) = \begin{bmatrix} \frac{\partial J}{\partial x_1} \\ \vdots \\ \frac{\partial J}{\partial x_n} \end{bmatrix} = \begin{bmatrix} x_1^1 - x_1^0 & \cdots & x_n^1 - x_n^0 \\ \vdots & \ddots & \vdots \\ x_1^n - x_1^0 & & x_n^n - x_n^0 \end{bmatrix}^{-1} \cdot \begin{bmatrix} J(X^1) - J(X^0) \\ \vdots \\ J(X^n) - J(X^0) \end{bmatrix}$$

where: $X^i = [x_1^i, x_2^i, \ldots, x_n^i]^T = [x_1^0, x_2^0, \ldots, x_i^0 + \delta_i, \ldots x_n^0]^T$, is a parameter sample obtained after perturbing the current parameter sample directed to the ith parameter, where $\delta_i$ is perturbing quantity; $J(X^i)$ is a difference between a quality index value $Q(X^i)$ and a quality index target value $Q_{target}$ corresponding to $X^i$; and i=1, 2, 3, . . . , n.

The reverse direction of the gradient calculated by the Formula, namely, $-\nabla J(X^n)$ is an optimized direction of the parameter; a next iteration point is produced by the following Formula, and the obtained new process parameter will be closer to the preset target value. That is, in step (5), the method for updating the current parameter sample is as follows:

$$X_{update}^0 = X^0 - \alpha^0 \cdot \nabla J(X^0)$$

where, $\alpha^0$ is a step size of parameter adjustment; $X^0$ is a current parameter sample; $X_{update}^0$ is the updated current parameter sample; and $\nabla J(X^0)$ is a gradient value. After obtaining the updated parameter $X_{update}^0$, the updated parameter needs to be de-normalized (as shown in Formula (2)), so that the parameter returns to a physical parameter value ($X_{denorm}$), which facilitates technicians to obtain a target value $J(X_{update}^0)$, $J(X_{update}^0) = Q(X_{update}^0) - Q_{target}$ at $X_{update}^0$ through experimental operation):

$$X_{denorm} = X_{norm} \times (U - L) + L$$

The above physical transformation is conducted only in the process of calculating quality index values or target values; and in the subsequent updating process, pretreated parameter data is always used to keep the treatment process consistent. Definitely, if a simulation method is used to calculate the quality index value or target value, the $X_{update}^0$ obtained can be directly used for judgment by programming.

In step (5), judge whether the quality index value $Q_2$ satisfies requirements; and if $|Q_2-Q_{target}|<\delta$, the optimization objective obtained has satisfied termination conditions, and the optimization progress stops; $X_{update}^0$ is the optimal parameter, and after physical transformation, the actual optimal parameter information can be output; on the contrary, it cannot satisfy the termination conditions, update the parameter sample in step (3), and return to step (4) to perform the next optimal computation.

After updating the parameter sample in step (3), the gradient computation matrix is updated. A newly obtained $(X_{update}^0, J(X_{update}^0))$ is used to substitute the point whose target value is the worst in the primary gradient computation matrix, and to be a current parameter sample (if it is $(X^0), J(X^0)$, it is without loss of generality), and $J(X)$ is expanded according to Taylor Series Expansion at $X^0$ thereof to obtain an updated gradient computation matrix:

$$\nabla J(X^0) = \begin{bmatrix} \frac{\partial Q}{\partial x_1} \\ \vdots \\ \frac{\partial Q}{\partial x_n} \end{bmatrix} = \begin{bmatrix} x_1^1-x_1^0 & \cdots & x_n^1-x_n^0 \\ \vdots & \ddots & \\ x_1^n-x_1^0 & & x_n^n-x_n^0 \end{bmatrix}^{-1} \cdot \begin{bmatrix} J(X^1)-J(X^0) \\ \vdots \\ J(X^n)-J(X^0) \end{bmatrix}$$

After obtaining the gradient information, the existing optimization method is to update parameters usually by a gradient descent algorithm. In such case, a step size $\alpha^0$ is set as a constant, and parameter variation $\Delta X=\alpha^0 \cdot \nabla J(X^0)$ only depends on the gradient of the current single point, but overlooks the accumulation of history gradient information; and the accumulation of history gradient information may provide a useful suggestion to the following optimized direction and step, thus adjusting the step size $\alpha^0$ more adaptively in the subsequent optimal steps. Therefore, in step (5) of the present invention, Adam (Adaptive Moment Estimation) is used to achieve the updating of the current parameter sample based on the accumulation of hi story gradient information.

Further, the value of step size $\alpha^0$ may be preset during initial updating, and in the subsequent updating process, adaptive moment estimation algorithm can be used to obtain the optimal step of each parameter after adaptive adjustment as follows:

$$X_{update}^0 = X^0 - \eta \frac{\hat{v}}{\sqrt{\hat{s}}+\delta}$$

where, $X^0$ is a current parameter sample; $X_{update}^0$ is an updated current parameter sample; $\eta$ is a preset step size coefficient; $\delta$ is a correction coefficient; $\hat{v}$ is correction of a first-order exponential moving average of history gradients, and calculated by the first-order exponential moving average of history gradients and history gradient information; s is correction of a second-order exponential moving average of history gradients, and calculated by the second-order exponential moving average of history gradients and history gradient information.

During updating for the mth time, correction of the first-order exponential moving average of the corresponding history gradients is $\widehat{v^{m-1}}$; correction of the second-order exponential moving average of the corresponding history gradients is $\widehat{s^{m-1}}$,; and the correction is respectively calculated by the following Formula:

$$\widehat{v^{m-1}} = \frac{v^{m-1}}{1-(\beta_1)^{m-1}}$$

$$\widehat{s^{m-1}} = \frac{s^{m-1}}{1-(\beta_2)^{m-1}}$$

$$v^{m-1} = \beta_1 \cdot v^{m-2} + (1-\beta_1)\nabla J(X^{m-1})$$

$$s^{m-1} = \beta_2 \cdot s^{m-2} + (1-\beta_2)\nabla J(X^{m-1}) \odot \nabla J(X^{m-1})$$

where: m is the current step of updating, $v^{m-1}$ is a first-order exponential moving average of the history gradients during updating for the mth time; $vs^{m-1}$ is a second-order exponential moving average of the history gradients during updating for the mth time; $v^0=0$; $s^0=0$; $\nabla J(X^{m-1})$ is a gradient value obtained after updating for the (m−1)th time; $\odot$ denotes element-wise multiplication corresponding to the matrix; $\beta_1$ is a first-order exponential decay rate coefficient; and $\beta_2$ is a second-order exponential decay rate coefficient. $\beta_1$ is 0.85-0.95; and $\beta_2$ is 0.99-0.999.

Specifically, the first-order exponential moving average of the history gradients is calculated:

$$v^0 = 0$$

$$v^1 = \beta_1 \cdot v^0 + (1-\beta_1)\nabla J(X^1)$$

$$\vdots$$

$$v^m = \beta_1 \cdot v^{m-1} + (1-\beta_1)\nabla J(X^m)$$

$\beta_1$ is a first-order exponential decay rate coefficient, and generally set as 0.9. The first-order exponential moving average is calculated to accelerate the optimization procedure. For example, if the gradient of a certain parameter component in preceding several optimal steps is a positive value, the first-order exponential moving average v will record and accumulate the trend, and increases the step of the parameter in the subsequent optimal step, thus achieving acceleration. The function of the first-order exponential moving average v is similar to the concept of momentum in physics; therefore, it is called momentum algorithm.

Calculation of the second-order exponential moving average of the history gradients:

$$s^0 = 0$$

$$s^1 = \beta_2 \cdot s^0 + (1-\beta_2)\nabla J(X^1) \odot \nabla J(X^1)$$

$$\vdots$$

$$s^m = \beta_2 \cdot s^{m-1} + (1-\beta_2)\nabla J(X^m) \odot \nabla J(X^m)$$

$\beta_2$ is a second-order exponential decay rate coefficient, and generally set as 0.999; and $\odot$ denotes the element-wise multiplication corresponding to the matrix. The optimization objective is only sensitive to a portion of parameters, but not sensitive to the change of other parameters. In respect to the optimization problem of multiple parameters, different optimal step sizes need to be configured directed to different parameters, thus fitting in the degree of influence to the optimization objective. The second-order exponential moving average s evaluates the influence to each parameter by accumulating the square of a gradient, thus improving the adaptability of the optimization method. If the square of the gradient of a target function on a certain dimension is always small, the descending step on the dimension will increase to accelerate convergence; otherwise, for some parameters having larger fluctuation, the optimal step will decrease, thus reducing fluctuation.

Error correction of exponential moving average. Initial values of v and s are generally set 0, which will result in an error in exponential moving average, and the error caused by the initial value is amended according to the following Formula. m denotes the mth optimal step at present.

$$\widehat{v^{m-1}} = \frac{v^{m-1}}{1-(\beta_1)^{m-1}}$$

$$\widehat{s^{m-1}} = \frac{s^{m-1}}{1-(\beta_2)^{m-1}}$$

Finally, the updating formula of process parameters is obtained as follows:

$$X^m = X^{m-1} - \eta \frac{\widehat{v^{m-1}}}{\sqrt{\widehat{s^{m-1}}} + \delta}$$

where, η is a preset step coefficient; and δ is a very small positive number (e.g., $10^{-8}$) to avoid that denominator is 0.

The method of the present invention can be used for optimizing the injection molding technology by various kinds of injection molding materials (including but not limited to plastics, rubber, magnetic powder, metal, and the like).

The model-free optimization method of process parameters of injection molding provided by the present invention has the following beneficial effects:

1. The model-free optimization method provided by the present invention need not build a surrogate model, and uses an iterative gradient estimation method to calculate the gradient direction at the current direction, which greatly reduces the large number of tests required by modeling, and is easy to be generalized to other process.

2. The present invention is in combination with adaptive moment estimation algorithm to achieve the rapid and adaptive optimization of injection molding process parameters, which solves the problems of slow rate of convergence, and not performing adaptive adjustment directed to different parameters, thus greatly reducing the optimal cost; thereby, the present invention has strong operability in implementation process.

3. Moreover, injection molding is a typical batch process; and the optimization method proposed by the present invention may be also popularized in the optimization of process parameters of other batch process (e.g., casting).

DETAILED DESCRIPTION OF THE EMBODIMENTS

The present invention will be described in detail by reference to the flow diagram of the present invention. The model-free optimization method of process parameters of injection molding provided by the present invention uses an iterative gradient estimation method to calculate the gradient direction of the current point as a parameter adjustment direction, thus optimizing the parameters constantly; during parameter optimization process, the adaptive moment estimation algorithm is used to achieve the adaptive adjustment of each parameter step, and the parameter obtained after adjustment each time will be subjected to a test to obtain an optimal target value corresponding to the parameter for such kind of iterative optimization till being up to the standard.

The present invention will be further described in detail in combination with the examples below.

Figure 1:
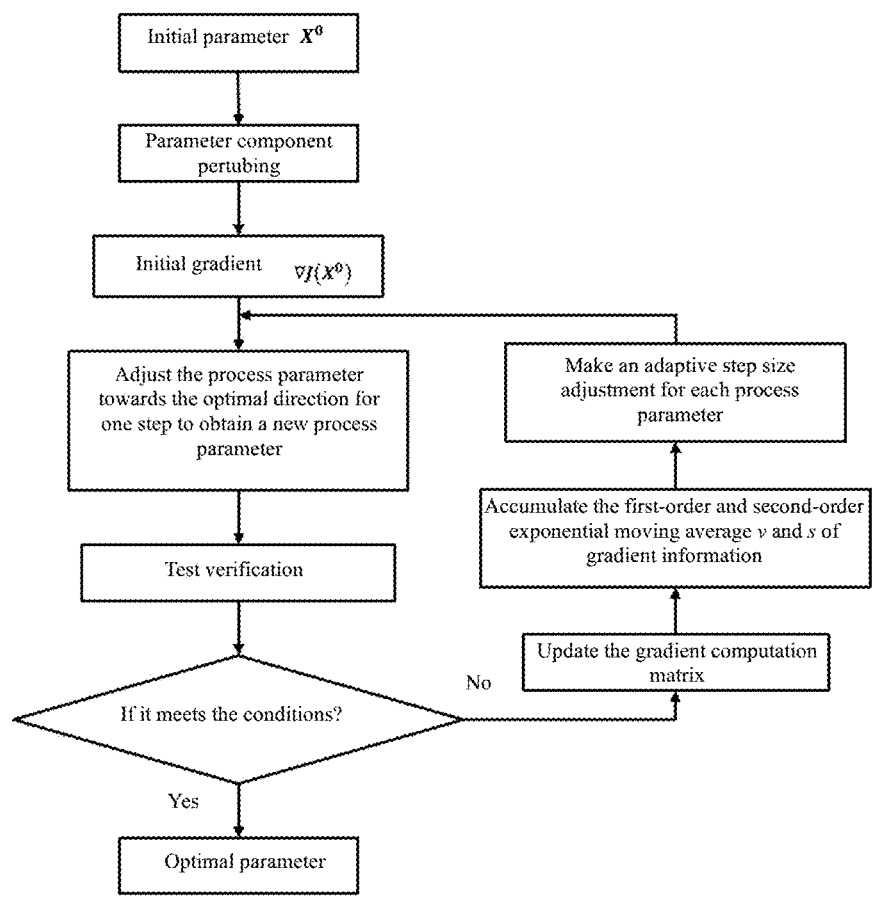
FIG. 1 shows a flow diagram of a model-free optimization method of process parameters of injection molding in the present invention.

As shown in FIG. 1, a model-free optimization method of process parameters of injection molding, includes the steps of:

(1) Method initiation: determining an optimized quality index Q (e.g., product weight, warping, and the like), a quality index target value $Q_{target}$ and a permissible error δ of an optimization objective; and choosing parameters $X=(x_1, x_2, \ldots, x_n)^T$ to be optimized and feasible scope thereof, as shown in the Formula (1):

$$\min_X J(X) = |Q(X) - Q_{target}| \qquad (1)$$

$$\text{s.t. } L_i \le x_i \le U_i, i = 1, 2, \ldots, n$$

$$X = (x_1, x_2, \ldots, x_n)^T$$

J(X) denotes the difference between the current quality index value and the target value. The quality index Q(X) can be regarded as an implicit function of process parameters X, and X consists of n parameters $x_1, x_2, \ldots, x_n$, such as, packing pressure, melt temperature; $U_i$ and $L_i$ denote upper and lower bound values of parameter $x_i$.

Different parameters have differences of orders of magnitude, for example, there is a difference of two orders of magnitude between melt temperature and injection time; usually, parameters need to be normalized by the Formula (2) during parameter optimization process, and the normalization can ensure that each parameter can change with the same extent.

$$x_{i_{norm}} = \frac{x_i - L_i}{U_i - L_i} \qquad (2)$$

(2) Initial parameter selection and initial gradient calculation. Firstly, an initial point $X^0$ is selected within a feasible scope, and each parameter is disturbed respectively; that is, $x_i^j = x_j^0 + \delta_i$, where i denotes the ith parameter, j shows the jth set of data, $x_i^j$ denotes the ith parameter in the jth set of parameter samples, $x_j^0$ is the jth parameter in the current parameter sample, $\delta_i$ is perturbing quantity; and the perturbing size and direction are not strictly limited, to obtain n+1 sets of process parameters and the corresponding quality values after perturbation, thereby obtaining the corresponding optimal target value J (a difference value between the corresponding quality value and quality target value):

$$X^0 = [x_1^0, x_2^0, \ldots, x_n^0]^T, \quad J(X^0) = J_0$$

$$X^1 = [x_1^1, x_2^1, \ldots, x_n^1]^T = [x_1^0 + \delta_1, x_2^0, \ldots, x_n^0]^T, \quad J(X^1) = J_1$$

$$\vdots$$

$$X^n = [x_1^n, x_2^n, \ldots, x_n^n]^T = [x_1^0, x_2^0, \ldots, x_n^0 + \delta_n]^T, \quad J(X^n) = J_n$$

J(X) is expanded according to the Taylor Series Expansion thereof at $X^0$:

$$J(X^1) = J(X^0) + (x_1^1 - x_1^0)\frac{\partial J}{\partial x_1} + \ldots + (x_n^1 - x_n^0)\frac{\partial J}{\partial x_n} + R_1(X) \quad (3)$$

$$\vdots$$

$$J(X^n) = J(X^0) + (x_1^n - x_1^0)\frac{\partial J}{\partial x_1} + \ldots + (x_n^n - x_n^0)\frac{\partial J}{\partial x_n} + R_n(X) \quad (4)$$

A matrix form is written below:

$$\begin{bmatrix} J(X^1) - J(X^0) \\ \vdots \\ J(X^n) - J(X^0) \end{bmatrix} = \begin{bmatrix} x_1^1 - x_1^0 & \cdots & x_n^1 - x_n^0 \\ \vdots & \ddots & \vdots \\ x_1^n - x_1^0 & & x_n^n - x_n^0 \end{bmatrix} \begin{bmatrix} \frac{\partial J}{\partial x_1} \\ \vdots \\ \frac{\partial J}{\partial x_n} \end{bmatrix} \quad (5)$$

The gradient value at the initial point $X^0$ is calculated by a gradient computation matrix (6);

$$\nabla J(X^0) = \begin{Bmatrix} \frac{\partial J}{\partial x_1} \\ \vdots \\ \frac{\partial J}{\partial x_n} \end{Bmatrix} = \begin{bmatrix} x_1^1 - x_1^0 & \cdots & x_n^1 - x_n^0 \\ \vdots & \ddots & \vdots \\ x_1^n - x_1^0 & & x_n^n - x_n^0 \end{bmatrix}^{-1} \cdot \begin{bmatrix} J(X^1) - J(X^0) \\ \vdots \\ J(X^n) - J(X^0) \end{bmatrix} \quad (6)$$

(3) Formula (6) is used to calculate the reverse direction of the gradient, that is, $-\nabla J(X^0)$ is an optimized direction of the parameter; a next iteration point is produced by Formula (7), and the obtained new process parameter will be closer to the preset target value;

$$X_{updte}^0 = X^0 - \alpha^0 \nabla J(X^0) \quad (7)$$

$\alpha^0$ is a step size of the current parameter adjustment. After obtaining the updated parameter $X_{updte}^0$, the updated parameter needs to be de-normalized (as shown in Formula (8)), so that the parameter returns to a physical parameter value, which facilitates technicians to obtain a quality index value $Q(X_{updte}^0)$ at $X_{updte}^0$ through experimental operation.

$$X_{denorm} = X_{norm} \times (U-L) + L \quad (8)$$

(4) Judging whether $Q(X_{denorm})$ satisfies the requirement, if $|Q(X_{denorm}) - Q_{target}| < \delta$, the obtained optimization objective has satisfied termination conditions, and the optimization progress stops; at this time, $X_{denorm}$ is the optimal parameter, otherwise, it cannot satisfy the termination conditions, continuously perform step (5).

(5) Updating the gradient computation matrix. A newly obtained $(X_{updte}^0, J(X_{updte}^0))$ is used to substitute the point whose quality value is the worst in the primary gradient computation matrix (if it is $(X^0, J(X^0))$, it is without loss of generality), and J(X) is expanded according to Taylor at $X_{updte}^0$ thereof to obtain an updated gradient computation matrix at this time $X^0 = X_{updte}^0$:

$$\nabla J(X^{n+1}) = \begin{bmatrix} \frac{\partial Q}{\partial x_1} \\ \vdots \\ \frac{\partial Q}{\partial x_n} \end{bmatrix} = \begin{bmatrix} x_1^1 - x_1^0 & \cdots & x_n^1 - x_n^0 \\ \vdots & \ddots & \vdots \\ x_1^n - x_1^0 & & x_n^n - x_n^0 \end{bmatrix}^{-1} \cdot \begin{bmatrix} J(X^1) - J(X^0) \\ \vdots \\ J(X^n) - J(X^0) \end{bmatrix} \quad (9)$$

(6) Adaptive step adjustment. After obtaining the gradient information, the existing optimization method is to update parameters usually by a stochastic gradient descent. In such case, a step size $\alpha^0$ is set as a constant, and parameter variation $\Delta X = \alpha^0 \cdot \nabla J(X^0)$ only depends on the gradient of the current single point, but overlooks the accumulation of history gradient information; and the accumulation of history gradient information may provide a useful suggestion to the following optimized direction and step, thus adjusting the step size $\alpha^0$ more adaptively in the subsequent optimal steps. Therefore, adaptive moment estimation algorithm is used in the present invention, and after through adaptive adjustment, the optimal step of each parameter is $$X_{updte}^0 = X^0 - \Delta X = X^0 - \eta \frac{\hat{v}}{\sqrt{\hat{s}} + \delta},$$

and the method has the following specific steps:

(6.1) Calculation of the first-order exponential moving average of history gradients:

$$v^0 = 0 \quad (10)$$

$$v^1 = \beta_1 \cdot v^0 + (1 - \beta_1)\nabla J(X^1)$$

$$\vdots$$

$$v^m = \beta_1 \cdot v^{m-1} + (1 - \beta_1)\nabla J(X^m)$$

$\beta_1$ is a first-order exponential decay rate coefficient, and generally set as 0.9. M is the current step of updating, choose the corresponding computational formula when corresponds to the frequency of updating, the first-order exponential moving average is calculated to accelerate the optimization procedure. For example, if the gradient of a certain parameter component in preceding several optimal steps is a positive value, the first-order exponential moving average v will record and accumulate the trend, and increases the step of the parameter in the subsequent optimal step, thus achieving acceleration. The function of the first-order exponential moving average v is similar to the concept of momentum in physics; therefore, it is called momentum algorithm.

(6.2) Calculation of the second-order exponential moving average of history gradients:

$$s^0 = 0 \quad (11)$$

$$s^1 = \beta_2 \cdot s^0 + (1 - \beta_2)\nabla J(X^1) \odot \nabla J(X^1)$$

$$\vdots$$

$$s^m = \beta_2 \cdot s^{m-1} + (1 - \beta_2)\nabla J(X^m) \odot \nabla J(X^m)$$

$\beta_2$ is a second-order exponential decay rate coefficient, and generally set as 0.999; and ⊙ denotes the element-wise multiplication corresponding to the matrix. The optimization objective is only sensitive to a portion of parameters, but not sensitive to the change of other parameters. In respect to the optimization problem of multiple parameters, different optimal step sizes need to be configured directed to different parameters, thus fitting in the influence to the optimization objective. The second-order exponential moving average sevaluates the influence to each parameter by accumulating the square of a gradient, thus improving the adaptability of the optimization method. If the square of the gradient of a target function on a certain dimension is always small, the descending step on the dimension will increase to accelerate convergence; otherwise, for some parameters having larger fluctuation, the optimal step will decrease, thus reducing fluctuation.

(6.3) Error correction of exponential moving average. Initial values of v and s are generally set to 0, which will result in an error in exponential moving average; and according to the Formula (12), such kind of error caused by the initial value is corrected; during updating for the mth time, correction of the first-order exponential moving average of the corresponding history gradients is $\widehat{v^{m-1}}$; and correction of the second-order exponential moving average of the corresponding history gradients is $\widehat{s^{m-1}}$:

$$\widehat{v^{m-1}} = \frac{v^{m-1}}{1-(\beta_1)^{m-1}} \quad (12)$$

$$\widehat{s^{m-1}} = \frac{s^{m-1}}{1-(\beta_2)^{m-1}}$$

where: m is the current step of updating, $v^{m-1}$ is a first-order exponential moving average of the history gradients during updating for the mth time; $s^{m-1}$ is a second-order exponential moving average of the history gradients during updating for the mth time; $v^0=0$; $s^0=0$; $\nabla J(X^{m-1})$ is a gradient value obtained after updating for the (m−1)th time.

(6.4) Obtaining the updating formula shown in (13) of the current parameter sample, and returning to step (4).

$$X^m = X^{m-1} - \eta \frac{\widehat{v^{m-1}}}{\sqrt{\widehat{s^{m-1}}} + \delta} \quad (13)$$

$\eta$ is a preset step size coefficient; and $\delta$ is a very small positive number (e.g., $10^{-8}$) to avoid that denominator is 0.

The present invention will be further described in detail in combination with the examples below.

EXAMPLE

Hereafter, optimization of process parameters of an optical plastic lens was set as an example to describe the specific implementation measures of the prevent invention in the process parameter optimization of plastic injection molding. The injection molding machine used in the example is type Zhafir VE400 from China HAITIAN GROUP, and the material used is polymethyl methacrylate (PMMA) from Sumipex.

Firstly, step (1) was performed for the initialization of the optimization method. Product weight served as an optimization objective, and the standard weight of the product was 8.16 g, that is, the target value of the product weight was 8.16 g, and process parameters to be optimized and scope thereof were selected, as shown in Table 1.

TABLE 1

Process parameters to be optimized and scope thereof

| Parameter | Symbol | Scope | Unit |
| --- | --- | --- | --- |
| Injection time | $x_1$ | 0.4-2.0 | s |
| Dwell time | $x_2$ | 0.5-4.0 | s |
| Dwell pressure | $x_3$ | 30-60 | MPa |
| Melt temperature | $x_4$ | 200-230 | °C. |
| Die temperature | $x_5$ | 20-50 | °C. |

Afterwards, step (2) was performed to choose an initial parameter within a scope of parameters randomly. The initial parameter selected in the example was $X^0=[x_1^0, x_2^0, \ldots, x_5^0]^T=[1.6\text{ s}, 3\text{ s}, 50\text{ MPa}, 200°\text{ C.}, 20°\text{ C.}]^T$, and then $X^0$ was normalized to be $X_{norm}^0=[0.75, 0.714, 0.667, 0, 0]^T$; and the product weight corresponding to the initial parameter was 25.3371 g. Each parameter component was perturbed to obtain other 4 sets of process parameters: $X_{norm}^1=[0.812, 0.714, 0.667, 0, 0]^T$, $X_{norm}^2=[0.75, 0.742, 0.667, 0, 0]^T$, $X_{norm}^3=[0.75, 0.714, 0.733, 0, 0]^T$, and $X_{norm}^4=[0.75, 0.714, 0.667, 0.0667, 0]^T$; $X_{norm}^5=[0.75, 0.714, 0.667, 0, 0.0667]^T$ was subjected to a test to obtain the corresponding product weight (product weight values corresponding to 1-5 points on the x-coordinate in FIG. 2) and to calculate the gradient of the initial point according to the Formula (6).

An optimal step size α=0.01 was set in step (3) to obtain a new process parameter $X_{norm}^{new}=[0.749, 0.70, 0.616, 0.011, 0.0047]$ after being optimized for one step.

Step (4) was used to judge whether a new process parameter $X_{norm}^{new}$ satisfied terminal conditions, and then the optimization proceeded to step (5), and a new process parameter $X_{norm}^{new}$ and its corresponding product weight replaced $X_{norm}^0$, then gradient computation matrix was updated to obtain the gradient information at $X_{norm}^{new}$.

Step (6) was executed to adaptively adjust the optimal step of each parameter component, returning to step (3). This cycle was repeated till the obtained product weight can satisfy the desired error range.

Figure 2:
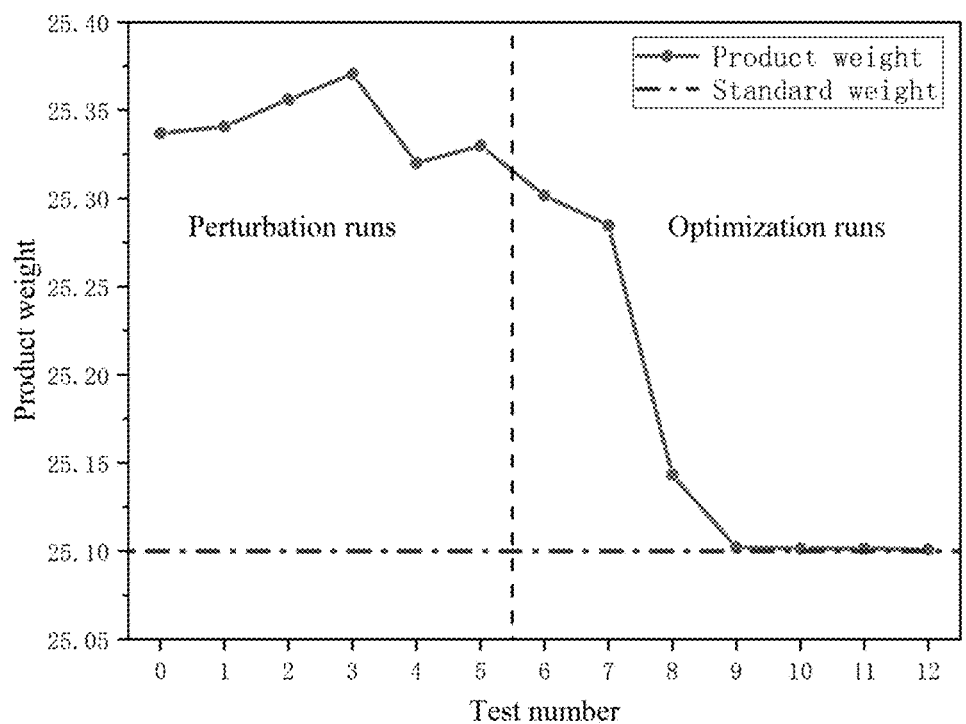
FIG. 2 shows a variation trend diagram of experiment number and product weight in the optimization procedure of an example.
Figure 3:
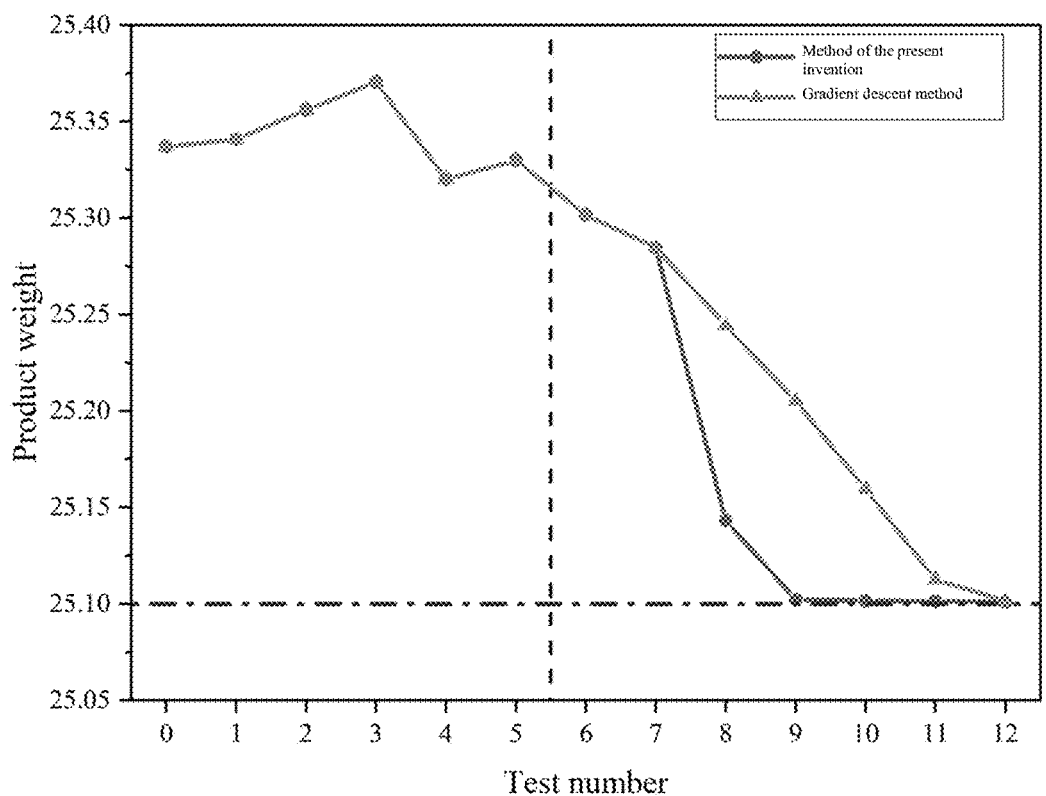
FIG. 3 shows a comparison diagram of results between the method of the present invention and the optimization method adjusted without using adaptive step.

FIG. 2. shows a variation trend diagram of experiment number and product weight in the optimization procedure of an example; it can be seen that after iterative optimization for 10 times, the product weight is up to the preset target; moreover, for the optimization method using adaptable step adjustment, the test number required is obviously less than that of the optimization method without adaptable step adjustment (see FIG. 3 (corresponding to "a gradient descent method"); and in the optimization method without adaptable step adjustment, the step size is set as a constant value α=0.01). Experimental results indicate that the present invention can achieve the target requirements with a small amount of tests and through rapid optimization of process parameters.

The optimization method of the present invention can be not only used for the process optimization of plastic injection molding, but also used for the injection molding technology using other injection materials, such as, rubber, magnetic powder, metal and the like or process optimization having the similar principle.

The invention claimed is:
1. A model-free optimization method of process parameters of injection molding, characterized by comprising the steps of:

(1) determining a quality index Q to be optimized and a quality index target value $Q_{target}$ directed to the injection molding technology to be optimized;

(2) determining n process parameters to be optimized, determining and pretreating initial values of the process parameters to be optimized to obtain an initial parameter sample;

(3) respectively perturbing each parameter of a current parameter sample to obtain n sets of perturbed parameter samples, and finally obtaining n+1 sets of parameter samples comprising the current parameter sample and corresponding n+1 quality index values $Q_1$;

(4) using n+1 quality index values $Q_1$ obtained by acquisition to calculate a gradient value at the current parameter sample;

(5) based on the obtained gradient value, updating the current parameter sample, and using the updated parameter sample to calculate a corresponding quality index value $Q_2$; making a comparison between the quality index value $Q_2$ and the quality index target value $Q_{target}$ of the quality index:

outputting an optimum process parameter if it meets the preset requirements;

or, using the updated parameter sample and quality index value $Q_2$ to replace a set of parameter sample having the worst optimal target value in n+1 sets of parameter samples in step (3) and the quality index value $Q_1$, and returning to step (4).

2. The model-free optimization method of process parameters of injection molding according to claim 1, characterized in that: in step (2), the pretreating process is as follows:

$$x_{i_{norm}} = \frac{x_i - L_i}{U_i - L_i}$$

wherein: $x_i$ is a certain process parameter; $x_{i_{norm}}$ is a pretreated parameter of $x_i$; $L_i$ is a minimum value corresponding to the process parameter; $U_i$ is a maximum value corresponding to the process parameter.

3. The model-free optimization method of process parameters of injection molding according to claim 1, characterized in that: the quality index value $Q_1$, and the quality index value $Q_2$ are obtained by simulations or experiments.

4. The model-free optimization method of process parameters of injection molding according to claim 1, characterized in that: in step (4), a method of calculating the gradient value is as follows:

$$\nabla J(X^0) = \begin{bmatrix} \frac{\partial J}{\partial x_1} \\ \vdots \\ \frac{\partial J}{\partial x_n} \end{bmatrix} = \begin{bmatrix} x_1^1 - x_1^0 & \cdots & x_n^1 - x_n^0 \\ \vdots & \ddots & \vdots \\ x_1^n - x_1^0 & & x_n^n - x_n^0 \end{bmatrix}^{-1} \cdot \begin{bmatrix} J(X^1) - J(X^0) \\ \vdots \\ J(X^n) - J(X^0) \end{bmatrix}$$

wherein: $X^i = [x_1^i, x_2^i, \ldots, x_n^i]^T = [x_1^0, x_2^0, \ldots, x_i^0 + \delta_i, \ldots x_n^0]^T$, is a parameter sample obtained after disturbing the current parameter sample directed to the ith parameter, wherein $\delta_i$ is disturbing quantity; $J(X^i)$ is a difference between a quality index value $Q(X^i)$ and a quality index target value $Q_{target}$ corresponding to $X^i$; and i=0, 1, 2, 3, ..., n.

5. The model-free optimization method of process parameters of injection molding according to claim 1, characterized in that: in step (5), a method of updating the current parameter sample is as follows:

$$X_{update}^0 = X^0 - \alpha^0 \cdot \nabla J(X^0)$$

wherein, $\alpha^0$ is a step size of parameter adjustment; $X^0$ is a current parameter sample; $X_{update}^0$ is the updated current parameter sample; and $\nabla J(X^0)$ is a gradient value.

6. The model-free optimization method of process parameters of injection molding according to claim 1, characterized in that: in step (5), Adam (Adaptive Moment Estimation) is used to achieve the updating of the current parameter sample based on the accumulation of history gradient information.

7. The model-free optimization method of process parameters of injection molding according to claim 1, characterized in that: the following Formula is used to achieve the updating of the current parameter sample:

$$X_{update}^0 = X^0 - \eta \frac{\hat{v}}{\sqrt{\hat{s}} + \delta}$$

wherein, $X^0$ is a current parameter sample; $X_{update}^0$ is an updated current parameter sample; $\eta$ is a preset step size coefficient; $\delta$ is a correction coefficient; $\hat{v}$ is correction of a first-order exponential moving average of history gradients, and calculated by the first-order exponential moving average of history gradients and history gradient information; $\hat{s}$ is correction of a second-order exponential moving average of history gradients, and calculated by the second-order exponential moving average of history gradients and history gradient information.

8. The model-free optimization method of process parameters of injection molding according to claim 7, characterized in that: during updating for the mth time, correction of the first-order exponential moving average of the corresponding history gradients is $\widehat{v^{m-1}}$; correction of the second-order exponential moving average of the corresponding history gradients is $\widehat{s^{m-1}}$; and the correction is respectively calculated by the following Formula:

$$\widehat{v^{m-1}} = \frac{v^{m-1}}{1 - (\beta_1)^{m-1}}$$

$$\widehat{s^{m-1}} = \frac{s^{m-1}}{1 - (\beta_2)^{m-1}}$$

$$v^{m-1} = \beta_1 \cdot v^{m-2} + (1 - \beta_1)\nabla J(X^{m-1})$$

$$s^{m-1} = \beta_2 \cdot s^{m-2} + (1 - \beta_2)\nabla J(X^{m-1}) \odot \nabla J(X^{m-1})$$

wherein: m is frequency of updating, $v^{m-1}$ is an first-order exponential moving average of history gradients during updating for the mth time; $v^0=0$; $s^0=0$; $\nabla J(X^{m-1})$ is a gradient value obtained after updating for the (m−1)th time; $\odot$ denotes element-wise multiplication corresponding to the matrix; $\beta_1$ is a first-order exponential decay rate coefficient; and $\beta_2$ is a second-order exponential decay rate coefficient.

9. The model-free optimization method of process parameters of injection molding according to claim 8, characterized in that: $\beta_1$ is 0.85-0.95, and $\beta_2$ is 0.99-0.999.

* * * * *